US010212362B2

United States Patent
Song et al.

(10) Patent No.: US 10,212,362 B2
(45) Date of Patent: Feb. 19, 2019

(54) METHOD AND APPARATUS FOR CREATING OR STORING RESULTANT IMAGE WHICH CHANGES IN SELECTED AREA

(71) Applicant: SAMSUNG ELECTRONICS CO., LTD., Suwon-si, Gyeonggi-do (KR)

(72) Inventors: Won-seok Song, Anyang-si (KR); Tae-hoon Kang, Suwon-si (KR); Jong-sun Kim, Suwon-si (KR); Myung-kyu Choi, Suwon-si (KR); Kwang-il Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 49 days.

(21) Appl. No.: 15/070,728

(22) Filed: Mar. 15, 2016

(65) Prior Publication Data

US 2016/0198098 A1    Jul. 7, 2016

Related U.S. Application Data

(63) Continuation of application No. 13/608,036, filed on Sep. 10, 2012, now Pat. No. 9,298,356.

(30) Foreign Application Priority Data

Dec. 23, 2011    (KR) .................. 10-2011-0141722

(51) Int. Cl.
*G06T 11/60*    (2006.01)
*H04N 5/232*    (2006.01)
(Continued)

(52) U.S. Cl.
CPC ....... *H04N 5/2621* (2013.01); *G06F 3/04845* (2013.01); *G06F 3/04883* (2013.01);
(Continued)

(58) Field of Classification Search
CPC .......... H04N 5/23216; H04N 5/23229; H04N 5/23293; H04N 5/2621; G06T 13/00; G06T 13/80
See application file for complete search history.

(56) References Cited

U.S. PATENT DOCUMENTS 6,621,524 B1    9/2003    Iijima et al.
2002/0051065 A1    5/2002    Takahashi
(Continued)

FOREIGN PATENT DOCUMENTS

JP    2004-038746 A    2/2004
JP    2007-241687 A    9/2007
(Continued)

OTHER PUBLICATIONS

Tompkin et al., "Towards Moment Imagery: Automatic Cinemagraphs," Conference for Visual Media Production (CVMP) Nov. 2011, pp. 87-93.*
(Continued)

*Primary Examiner* — Dennis A Hogue
(74) *Attorney, Agent, or Firm* — Jefferson IP Law, LLP

(57) ABSTRACT

An image processing method includes: defining a selection area in a first still image according to a user input; extracting image data that correspond to the selected area from a second still image; combining the image data extracted from the second still image on the selection area of the first still image to create a composite image; and sequentially displaying the first still image and the composite image.

19 Claims, 12 Drawing Sheets

(51) Int. Cl.
H04N 5/262 (2006.01)
G06F 3/0484 (2013.01)
G06F 3/0488 (2013.01)
H04N 101/00 (2006.01)

(52) U.S. Cl.
CPC ......... G06T 11/60 (2013.01); H04N 5/23216 (2013.01); H04N 5/23229 (2013.01); H04N 5/23293 (2013.01); H04N 2101/00 (2013.01)

(56) References Cited

U.S. PATENT DOCUMENTS

| | | | |
|---|---|---|---|
| 2003/0222888 A1 | 12/2003 | Epshteyn | |
| 2004/0004626 A1 | 1/2004 | Ida et al. | |
| 2004/0036898 A1 | 2/2004 | Takahashi | |
| 2006/0071943 A1* | 4/2006 | Matsumoto | H04N 5/275 345/622 |
| 2008/0001950 A1* | 1/2008 | Lin | G06T 13/80 345/473 |
| 2011/0007029 A1* | 1/2011 | Ben-David | G06F 3/044 345/174 |
| 2011/0007086 A1* | 1/2011 | Kim | G06T 11/001 345/581 |
| 2012/0047437 A1* | 2/2012 | Chan | G06F 3/0482 715/720 |
| 2013/0120439 A1* | 5/2013 | Harris | G11B 27/034 345/619 |

FOREIGN PATENT DOCUMENTS

| | | |
|---|---|---|
| JP | 2010-283412 A | 12/2010 |
| KR | 10-2003-0002919 A | 1/2003 |

OTHER PUBLICATIONS

Szeliski, "Image Alignment and Stitching: A Tutorial," Technical Report MSR-TR-2004-92, Microsoft Corporation, 2004.*
Anonymous, "Graphics Interchange Format," Wikipedia article, dated by Wayback Machine at archive.org to Aug. 6, 2009, from <https://web.archive.org/web/20090806115720/http://en.wikipedia.org/wiki/Graphics_Interchange_Format>, 11 pages.
Alzani's Channel, "How to Make a Cinemagraph," YouTube video, published Jul. 27, 2011, <https://www.youtube.com/watch?v=Uj7-npcf4J0>, 2 pages.
Bahena, "Quick tutorial—Cinemagraphs with single mask Photoshop CS5—English Captions," YouTube video, published May 27, 2011, <https://www.youtube.com/watch?v=CJVZQNIAB9w>, 3 pages.
Beck et al., "cinemagraphs.com" Homepage, retrieved by archive.rog on Aug. 15, 2011 at <https://web.archive.org/web/20110815074730/http://cinemagraphs.com>, 1 page.
Edenberg, "How to Make a Cinemagraph," Jun. 29, 2011, from <http://www.adorama.com/alc/0013110/article/How-To-Make-A-Cinemagraph>, 7 pages.
PROTIPS, "Pro Tips: Cinemagraph Tutorial for Photoshop CS5 (English Language)," YouTube video, published Aug. 26, 2011, <https://www.youtube.com/watch?v=QJBsXEfQm-Y>, 2 pages.
Scavarelli, "Cinemagraph / Subtle GIF Tutorial," May 4, 2011, from <http://portfolio.anthony-scavarelli.com/2011/05/04/the-subtle-gif-experiment>, 6 pages.
Steiner, "Simple Animations," dated on Wayback Machine at archive.org to Feb. 4, 2005, from <https://web.archive.org/web/20050204063924/http://www.gimp.org/tutorials/Simple_Animations/>, 3 pages.
PCT Search and Written Opinion issued for related application PCT/KR2012/010545, dated Jan. 10, 2013, 9 pages.
Office Action issued in related application KR 10-2011-0141722, dated Jul. 24, 2017, with English language translation, 20 pages.

* cited by examiner

METHOD AND APPARATUS FOR CREATING OR STORING RESULTANT IMAGE WHICH CHANGES IN SELECTED AREA

CROSS-REFERENCE TO RELATED PATENT APPLICATIONS

This application is a continuation of U.S. patent application Ser. No. 13/608,036, filed Sep. 10, 2012, now U.S. Pat. No. 9,298,356, which claims the priority benefit of Korean Patent Application No. 10-2011-0141722, filed on Dec. 23, 2011, in the Korean Intellectual Property Office, the disclosures of which are incorporated herein in their entirety by reference.

BACKGROUND

Embodiments of the disclosure relate to an image processing method, an image processing apparatus, a digital photographing apparatus controlling method, a digital photographing apparatus, and a computer readable recording medium associated therewith.

Demands for recording moving subjects with lively, realistic effects have increased, and video images are being regarded as one way to record the motion of a subject. Also, continuously shot moving pictures of a subject may contain the whole motion of the subject, but a large storage capacity is required to store them.

SUMMARY

Various embodiments provide a convenient method of showing a subject with a moving effect by using still images, so that the subject may appear more appealing.

Various embodiments also provide a method of recording a subject with a moving effect, which uses less storage capacity.

According to an embodiment, there is provided an image processing method including: receiving a user input that defines a selection area in a first still image; defining the selection region according to the user input; extracting image data that correspond to the selection area from a second still image; combining the image data extracted from the second still image on the selection area of the first still image to create a composite image; and sequentially displaying the first still image and the composite image.

The user input may be a touch-screen input obtained by touching the selection area on a touch screen.

The first still image and the second still image may be continuous shot images.

The image processing method may further include creating a mask for extracting the image data corresponding to the selection area from the second still image, and extracting the image data that correspond to the selection area from the second still image may be performed using the mask.

The image processing method may further include at least one of: increasing a number of selection areas according to a user input; changing a contour of the selection area according to a user input; changing a size of the selection area according to a user input; and changing a position of the selection area according to a user input.

The image processing method may further include creating a resultant image file that stores a resultant image sequentially displaying the first still image and the composite image.

The receiving of the user input may be performed while the first still image is being reproduced, and the image processing method may further include searching for the second still image continuously shot with the first still image when the user input that defines the selection area is received.

The image processing method may further include at least one of: adjusting a speed of sequentially displaying the first still image and the composite image according to a user input; and changing the composite image being reproduced, according to a user input.

The second still image may be a plurality of still images continuously shot with the first still image, the creating of the composite image may include creating a composite image with each of the plurality of second still images, and the sequentially displaying may include sequentially displaying the first still image and the composite images for the plurality of second still images.

According to another embodiment, there is provided an image processing apparatus including: a selection area setting unit that defines a selection area in a first still image according to a user input; an image composition unit that extracts image data corresponding to the selection area from a second still image and combines the image data extracted from the second still image on the selection area of the first still image to create a composite image; and an image reproducing unit that sequentially displays the first still image and the composite image.

The user input may be a touch-screen input obtained by touching the selection area on a touch screen.

The first still image and the second still image may be continuous shot images.

The image processing apparatus may further include a selection area information generating unit that creates a mask for extracting the image data corresponding to the selection area from the second still image, and the image composition unit may extract the image data that corresponds to the selection area from the second still image using the mask.

The selection area setting unit may perform at least one of: increasing a number of selection areas according to a user input; changing a contour of the selection area according to a user input; changing a size of the selection area according to a user input; and changing a position of the selection area according to a user input.

The image processing apparatus may further include a file creation unit that creates a resultant image file that stores a resultant image sequentially displaying the first still image and the composite image.

The image processing apparatus may further include an image search unit that searches for the second still image continuously shot with the first still image when the user input that defines the selection area is received while the first still image being reproduced.

The image reproducing unit may perform at least one of: adjusting a speed of sequentially displaying the first still image and the composite image according to a user input; and changing the composite image being reproduced, according to a user input.

The second still image may be a plurality of still images continuously shot with the first still image, the image composition unit may create a composite image with each of the plurality of second still images, and the image reproducing unit may sequentially display the first still image and the composite images with the plurality of second still images.

According to another embodiment, there is provided a non-transitory computer readable storage medium storing computer program codes for executing an image processing method by a processor, the image processing method including: receiving a user input that defines a selection area in a first still image; defining the selection area according to the user input; extracting image data that correspond to a selection area from a second still image; combining the image data extracted from the second still image on the selection area of the first still image to create a composite image; and sequentially displaying the first still image and the composite image.

According to another embodiment, there is provided a method of controlling a digital photographing apparatus, the method including: photographing a plurality of second still images; receiving a user input that defines a selection area; defining the selection area according to the user input; and sequentially reproducing image data of the plurality of second still images that correspond to the selection area.

The photographing may include sequentially photographing the plurality of second still images.

The receiving of the user input may be performed while a first still image is being reproduced as one of the plurality of second still images.

The sequential reproducing of the image data may include repeating a sequential display of the image data of the plurality of second still images that correspond to the selection area.

The method may further include combining each image data of the plurality of second still images that correspond to the selection area with a first still image that is one of the plurality of second still images to create a plurality of composite images, and the sequential playing of the image data may include sequentially displaying the first still image and the plurality of composite images.

The sequential reproducing of the image data may include sequentially displaying the image data of the plurality of second still images that correspond to the selection area in a region of a first still image that corresponds to the selection area, wherein the first still image may be one of the plurality of second still images.

The method may further include storing the first still image, information defining the selection area, and the image data of the plurality of second still images that correspond to the selection area.

According to another embodiment, there is provided a digital photographing apparatus including: a photographing unit that photographs a plurality of still images; a selection area setting unit that sets a selection area according to a user input; and an image reproducing unit that sequentially reproduces image data of the plurality of still images that correspond to the selection area.

The photographing unit may further continuously photograph the plurality of second still images.

The user input may be received while a first still image is being reproduced as one of the plurality of still images.

The image reproducing unit may further repeat sequential displaying of the image data of the plurality of still images that correspond to the selection area.

The digital photographing apparatus may further include an image composition unit that combines each image data of the plurality of still images that correspond to the selection area with a first still image that is one of the plurality of still images to create a plurality of composite images, and the image reproducing unit may sequentially reproduce the first still image and the plurality of composite images.

The image reproducing unit may sequentially display the image data of the plurality of second still images that correspond to the selection area in a region of a first still image that corresponds to the selection area, wherein the first still image may be one of the plurality of still images.

The digital photographing apparatus may further include a memory that stores the first still image, information defining the selection area, and the image data of the plurality of still images that correspond to the selection area.

According to another embodiment, there is provided an image processing method including: creating a resultant image play file that includes a first still image, selection area information indicating a selection area of the first still image defined according to a user input, and a second still image of which image data that correspond to the selection area of the first still image may be displayed in a region corresponding to the selection area, wherein the resultant image play file may sequentially display the first still image and the image data of the second still image that correspond to the selection area on the first still image when reproduced; and storing the resultant image play file.

The image processing method may further include creating and storing a resultant image file that includes a resultant image sequentially displaying the first still image and image data of the second still image that correspond to the selection area on the first still image.

The image processing method may further include: determining whether the resultant image file is decodable; playing the resultant image with the resultant image file if the resultant image file is decodable; and playing the resultant image with the resultant image play file if the resultant image file is not decodable.

The selection area information may be a mask that extracts image data of the second still image that corresponds to the selection area from the second still image when the mask is computed with the second still image.

According to another embodiment, there is provided an image processing apparatus including: a file creation unit that creates a resultant image play file that includes a first still image, selection area information indicating a selection area of the first still image defined according to a user input, and a second still image of which image data that correspond to the selection area of the first still image is displayed in a region corresponding to the selection area, wherein the resultant image play file sequentially displays the first still image and the image data of the second still image that correspond to the selection area on the first still image when reproduced; and a data storage unit that stores the resultant image play file.

The file creation unit may further include a resultant image file that stores the resultant image.

The image processing apparatus may further include an image reproducing unit that determines whether the resultant image file is decodable, reproduces the resultant image with the resultant image file if the resultant image file is decodable, and plays the resultant image with the resultant image file if the resultant image file is not decodable.

The selection area information may be a mask that extracts image data of the second still image that corresponds to the selection area from the second still image when the mask is computed with the second image.

According to another embodiment, there is provided a non-transitory computer readable recording medium storing a resultant image play file that includes a first still image, selection area information indicating a selection area of the first still image defined according to user input, and a second still image of which image data that correspond to the selection area of the first still image is displayed in a region corresponding to the selection area, wherein the resultant image play file sequentially displays the first still image and the image data of the second still image that correspond to the selection area on the first still image when reproduced.

The non-transitory computer readable recording medium may further store a resultant image file that comprises a resultant image sequentially displaying the first still image and image data of the second still image that correspond to the selection area on the first still image.

The selection area information may be a mask that extracts image data of the second still image that corresponds to the selection area from the second still image when the mask is computed with the second image.

BRIEF DESCRIPTION OF THE DRAWINGS

The above and other features and advantages of will become more apparent by describing in detail exemplary embodiments thereof with reference to the attached drawings in which.

DETAILED DESCRIPTION

As used herein, the term "and/or" includes any and all combinations of one or more of the associated listed items. Expressions such as "at least one of," when preceding a list of elements, modify the entire list of elements and do not modify the individual elements of the list.

Certain embodiments are described more fully with reference to the accompanying drawings, in which various inventive aspects and features are shown. In the following description, various features are described, and a detailed description of certain other features that are obvious to one of ordinary skill in the art are not provided to avoid obscuring the inventive subject matter.

The specification and drawings are provided only for illustrative purposes, and do not limit the scope of the disclosure, which should be defined by the claims. Unless otherwise defined, terms used herein have the meaning as commonly understood by one of ordinary skill in the art to which this invention belongs. It will be further understood that terms should be interpreted as having a meaning that is consistent with their meaning in the context of the relevant art and will not be interpreted in an idealized or overly formal sense unless expressly so defined herein.

Figure 1:
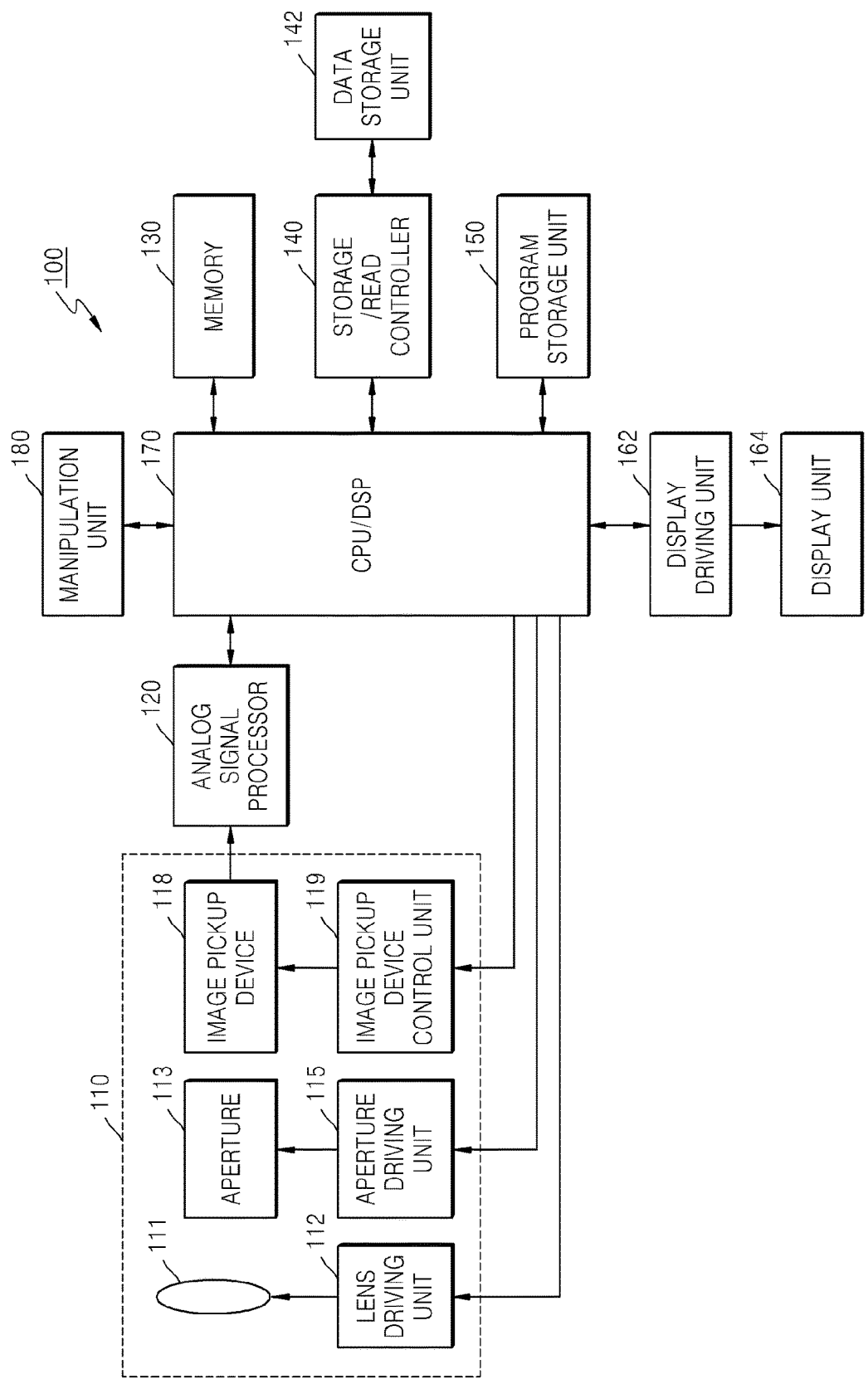
FIG. 1 is a block diagram of a digital photographing apparatus as an example of an image processing apparatus, according to an embodiment.

FIG. 1 is a block diagram of a digital photographing apparatus 100 as an example of an image processing apparatus, according to an embodiment.

In the present embodiment, referring to FIG. 1, the digital photographing apparatus 100 includes a photographing unit 110, an analog signal processor 120, a memory 130, a storage/read controller 140, a data storage unit 142, a program storage unit 150, a display driving unit 162, a display unit 164, a central processing unit/digital signal processor (CPU/DSP) 170, and a manipulating unit 180.

The overall operation of the digital photographing apparatus 100 is controlled by the CPU/DSP 170. The CPU/DSP 170 provides a control signal for operating individual elements, such as a lens driving unit 112, an aperture driving unit 115, an image pickup device control unit 119, and the like.

The photographing unit 110, which is an element for generating an electric image signal from incident light, includes a lens 111, the lens driving unit 112, an aperture 113, the aperture driving unit 115, an image pickup device 118, and the image pickup device control unit 119.

The lens 111 may include a plurality of lenses. The position of the lens 111 is controlled by the lens driving unit 112. The lens driving unit 112 may control the position of the lens 111 according to a control signal from the CPU/DSP 170.

The aperture 113, whose degree of opening may be controlled by the aperture driving unit 115, may adjust an amount of light incident onto the image pickup device 118.

An optical signal that has passed the lens 111 and the aperture 113 forms an image of a subject upon reaching a light receiving surface of the image pickup device 118. A charge coupled device (CCD) or a complementary metal oxide semiconductor image sensor (CIS) for converting an optical signal to an electric signal may be used as the image pickup device 118. A sensitivity of the image pickup device 118 may be controlled by the image pickup device control unit 119. The image pickup device control unit 119 may control the image pickup device 118 in real time according to a control signal automatically generated in response to an input image signal, or a control signal manually input by a user.

An exposure time of the image pickup device 118 is controlled using a shutter (not shown). The shutter may be a mechanical shutter for adjusting light incidence by moving a screen or may be an electronic shutter for adjusting exposure by supplying an electric signal to the image pickup device 118.

The analog signal processor 120 may perform noise reduction processing, gain adjustment, waveform shaping, analog-to-digital conversion, or the like on an analog signal from the image pickup device 118.

The signal processed by the analog signal processor 120 may be input to the CPU/DSP 170 directly or via the memory 130. The memory 130 may serve as a main memory of the digital photographing device 100, and temporarily store information required during an operation of the CPU/DSP 170. The program storage unit 150 may store a program for operating the digital photographing apparatus 100, such as an operating system, an application system, and the like.

The digital photographing apparatus 100 may include the display unit 164 for displaying an operation status or image information captured by the digital photographing device 100. The display unit 164 may provide visual information and/or auditory information to the user. To provide visual information, the display unit 164 may include, for example, a liquid crystal display (LCD) panel, an organic light-emitting display (OLED) panel, or the like. The display unit 164 may be a touch screen.

The display driving unit 162 may provide a driving signal to the display unit 164.

The CPU/DSP 170 may process an input image signal, and may control each element of the digital photographing apparatus 100 according to the input image signal or an external input signal. The CPU/DSP 170 may reduce noise of the input image pickup signal, and may perform image signal processing for image quality improvement, for example, gamma correction, color filter array interpolation, color matrix, color correction, and color enhancement. Compression may be performed on image data generated from the image signal processing for image quality improvement to generate an image file, from which the image data may also be restored. A compression format of the image data may be reversible or irreversible. Appropriate examples of the compression format for still images are a Joint Photographing Experts Group (JPEG) format, a JPEG 2000 format, and the like. For moving pictures, a plurality of frames may be compressed according to a Moving Picture Experts Group (MPEG) standard, to generate a moving picture file. The image file may be created according to an Exchangeable image file format (Exif) standard.

Image data output from the CPU/DSP 170 may be input to the storage/read controller 140 directly or via the memory 130. The storage/read controller 140 may store the image data in the data storage unit 142 automatically or according to a signal input from the user. The storage/read controller 140 may read data from the image file stored in the data storage unit 142, and may provide the data to the display driving unit 162 via the memory 130 or another path to display the image on the display unit 164. The data storage unit 142 may be a separable component or a built-in component of the digital photographing apparatus 100.

The CPU/DSP 170 may also perform obscuring, coloring, blurring, edge enhancing, image analysis processing, image recognition, image effect processing, and the like. The image recognition may be a face recognition process, a scene recognition process, or the like. The CPU/DSP 170 may perform a display image signal process for displaying on the display unit 164. For example, brightness level adjustment, color correction, contrast adjustment, contour enhancing, screen dividing, creation, and composition of images, such as a character image, may be performed. The CPU/DSP 170 may perform a predetermined image signal process on image data to be displayed on an external monitor connected thereto, and transfer the processed image data to display a corresponding image on the external monitor.

The CPU/DSP 170 may execute a program stored in the memory 130 that serves as a program storage unit. The CPU/DSP 170 may include an extra module for generating a control signal for auto-focusing, zoom ratio changes, focus shifting, auto-exposure correction, and the like, to provide the control signal to the aperture driving unit 115, the lens driving unit 112, and the image pickup device control unit 119, and may control components of the digital photographing apparatus 100, such as the shutter, a strobo, and the like.

The manipulation unit 180 is an element via which the user may input a control signal. The manipulation unit 180 may include a variety of functional buttons, for example, a shutter-release button for inputting a shutter-release signal for exposing the image pickup device 118 to light for a predetermined time to capture an image, a power button for inputting a control signal for controlling powering on or off, a zoom button for widening or narrowing an angle of view according to an input, a mode selection button, and other buttons for photographing set value adjustment. The manipulation unit 180 may be embodied in any form that allows a user to input a control signal, for example, as a button, a keyboard, a touch pad, a touch screen, a remote controller, or the like.

The digital photographing apparatus 100 of FIG. 1 is an exemplary embodiment, and the present disclosure is not limited to the digital photographing apparatus 100 of FIG. 1. The present disclosure may be applicable in any device capable of reproducing images stored in a storage medium, for example, a PDA, a mobile phone, or a computer, in addition to the digital photographing apparatus 100 capable of shooting and reproducing images. The digital photographing apparatus 100 may have any configuration, not limited to that illustrated in FIG. 1. Although the present and following embodiments of the present disclosure are described mostly focusing on the digital photographing apparatus 100 of FIG. 1, the present disclosure is not limited to the digital photographing apparatus 100.

Figure 2:
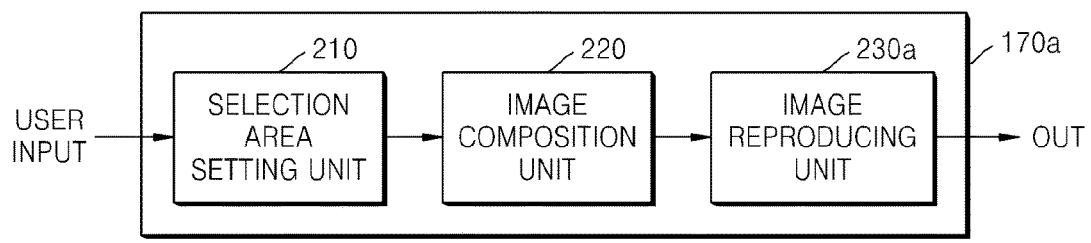
FIG. 2 is a block diagram illustrating a configuration of a CPU/DSP, according to an embodiment.

FIG. 2 is a block diagram illustrating a configuration of a CPU/DSP 170a, according to an embodiment.

In the present embodiment, the CPU/DSP 170a may include a selection area setting unit 210, an image composition unit 220, and an image reproducing unit 230a.

In some embodiments, the digital photographing apparatus 100 may create a resultant image with a selection area defined in a first still image serving as a background and in which sequentially varying image data are displayed, wherein constant data are displayed in a non-selected, still area of the first still image. The image data sequentially displayed in the selection area may be extracted from a second still image.

In some embodiments, the first still image and second still image may be continuous shot images. In some embodiments, the second still image may include a plurality of still images.

The selection area setting unit 210 defines the selection area in the first still image according to a user's input. To this end, the selection area setting unit 210 may receive the user's input by which the selection area is defined, and define the selection area according to the user's input. The user's input may be input via the manipulation unit 180, which may be implemented as a touch screen, a touch pad, or a manipulation key, as described above. The first still image is a still image that determines the background of the resultant image.

Figure 3:
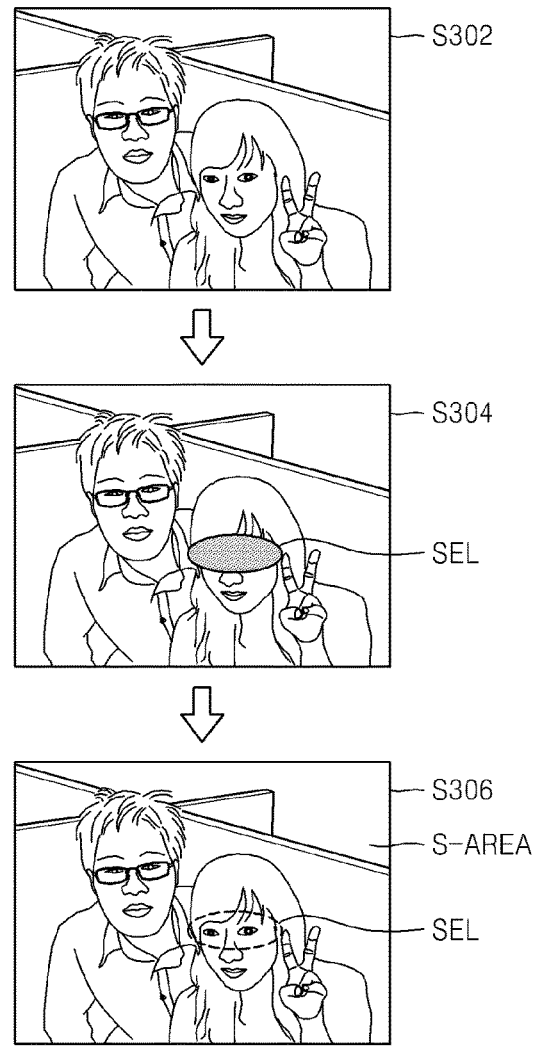
FIG. 3 illustrates a process of selecting a selection area.

FIG. 3 illustrates a process of selecting the selection area.

With the first still image reproduced (S302), if a user selects a selection area SEL (S304), the selection area selected by the user is defined as the selection area SEL (S306). Once part of the first still image is selected as the selection area SEL, the non-selected part of the first still image is set as a still area S-AREA. The still area S-AREA is an area in which data of the first still image is displayed in a resultant image.

In some embodiments, the selection area setting unit 210 may add a selection area SEL, or may change shape, size, or position of the selection area SEL according to the user's input. The user input may be a key input, a touch screen input, or a touch pad input.

Referring back to FIG. 2, the image composition unit 220 extracts data that corresponds to the selection area SEL from the second still image to merge the extracted data with the selection area of the first still image. As a result, a composite image of the second still image is created. If there is a plurality of second still images, a composite image of each second still image may be created.

The image reproducing unit 230 sequentially reproduces the first still image and the composite image. If there is a plurality of second still images, the image reproducing unit 230 may sequentially reproduce the first still image and a plurality of composite images of the second still images.

In some embodiments, the image reproducing unit 230a may repeat sequential playback of the first still image and composite image, for example, until a user's input instructing the playback of the resultant image be stopped is received.

Figure 4:
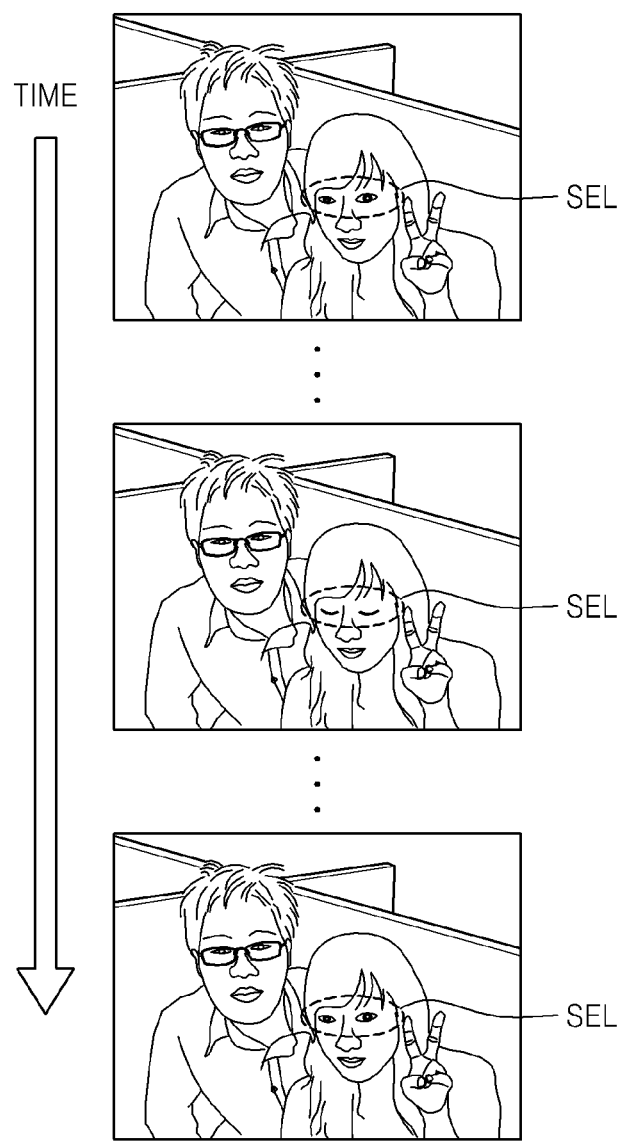
FIG. 4 is a diagram illustrating a resultant image, according to an embodiment.

FIG. 4 is a diagram illustrating a resultant image, according to an embodiment.

In the present embodiment, the resultant image is displayed with a moving effect only in the selection area SEL. For example, as illustrated in FIG. 4, constant data of the first still image are constantly displayed in the non-selection area, while image data of the first still image and the second still image are sequentially displayed in time. For example, as in the embodiment of FIG. 4, a subject may be displayed in the selection area (SEL) with varying eye shapes.

In some embodiments, the plurality of composite images may be repeatedly reproduced. For example, if there are three different composite images, after sequentially reproducing the three composite images, the sequential reproduction of the three composite images may be repeated.

In some embodiments, repeated sequential playback of the composite images may render selectively only a user's selection area to create a moving effect. This may lead to increased user's convenience and may provide an interesting effect that attracts users. The creation of the resultant image with merely a few still images may advantageously lead to a reduced storage space and less processing load.

Figure 5:
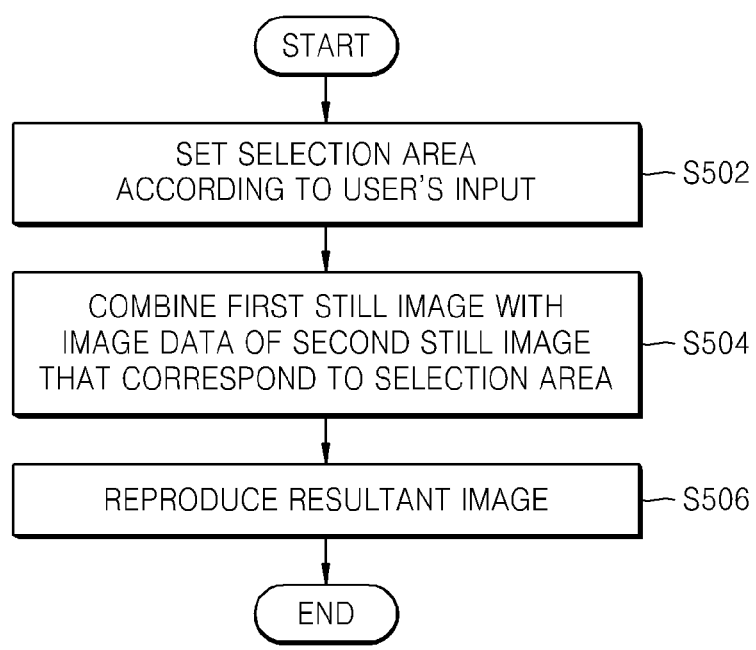
FIG. 5 is a flowchart of an image processing method, according to an embodiment.

FIG. 5 is a flowchart of an image processing method, according to an embodiment.

In the present embodiment, the image processing method includes setting a selection area (SEL) according to a user's input (S502). In some embodiments, with a first still image displayed, a user may input an instruction to select the selection area (SEL) in the first still image, and the selection area (SEL) may be selected according to the user's input.

Next, the first still image is combined with image data of the second still image that correspond to the selection area (SEL), thereby creating a composite image with the second still image (S504).

Next, a resultant image sequentially displaying the first still image and the composite image is reproduced (S506).

Figure 6:
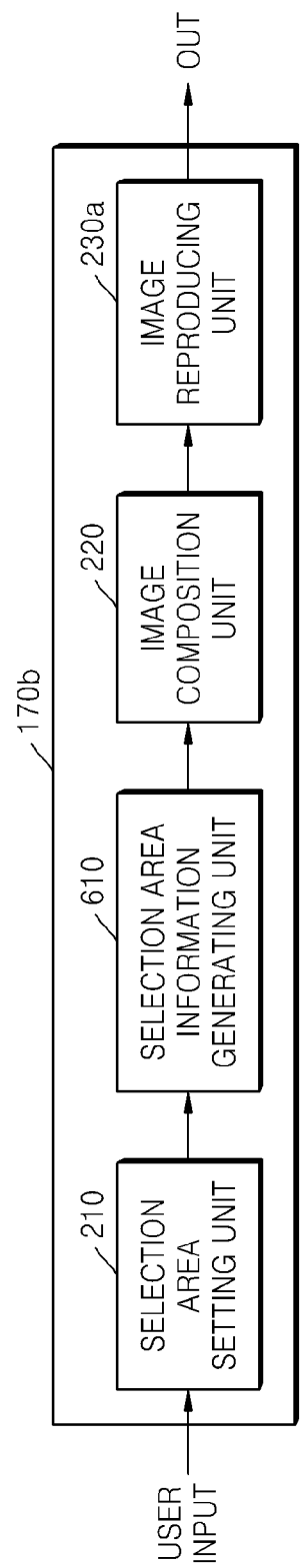
FIG. 6 is a block diagram illustrating a configuration of a CPU/DSP, according to another embodiment.

FIG. 6 is a block diagram illustrating a configuration of a CPU/DSP 170b, according to another embodiment.

In the present embodiment, the CPU/DSP 170b includes a selection area setting unit 210, a selection area information generating unit 610, an image composition unit 220, and an image reproducing unit 230a. The resultant image may be reproduced in such a way that the image data of the second still image that correspond to the selection area SEL and the first still image are sequentially displayed in the selection area (SEL) of the first still image when the first still image is being reproduced.

The selection area setting unit 210 defines the selection area (SEL) in the first still image according to a user's input.

The selection area information generating unit 610 generates selection area information according to the user's input. The selection area information is information about location and area of the selection area (SEL). For example, the selection area information may include coordinates or the contour of the selection area (SEL).

In some embodiments, the image composition unit 220 may extract image data that correspond to the selection area (SEL) of the first still image from the second still image based on the selection area information, and combine the extracted image data with the first still image, thereby creating a composite image. The image reproducing unit 230a may reproduce a resultant image with the first still image and the composite image being sequentially displayed.

In some embodiments, the image composition unit 220 may process a still area (S-AREA), which is the rest of the second still image excluding the selection area (SEL), to be transparent. The image reproducing unit 230a may sequentially reproduce the first still image and the second still image having an S-AREA processed to be transparent as a resultant image when the first still image is being reproduced. The first still image serves as a background image.

In some other embodiments, the image composition unit 230a may extract only image data that correspond to the selection area SEL from the second still image and store the image data in the memory 130 (FIG. 1), and the selection area information generating unit 610 may store the selection area information about the selection area (SEL) in the memory 130. When reproducing a resultant image, the image reproducing unit 230a may reproduce the resultant image to sequentially display the first still image and second still image in the selection area SEL of the first still image that is defined by the selection area information, by displaying the image data of the second still image corresponding to the selection area SEL that are stored in the memory 130 while the first still image is being reproduced.

Figure 7:
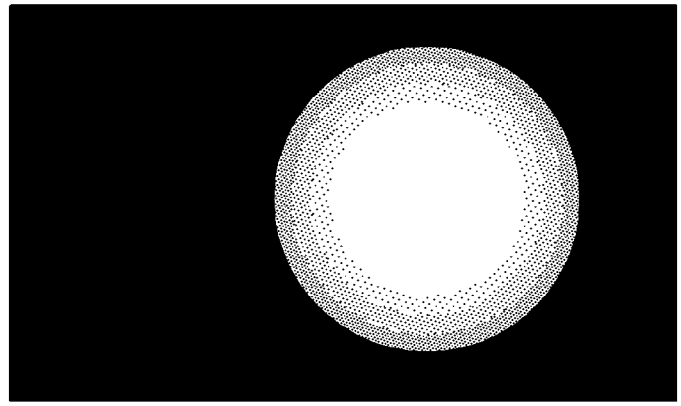
FIG. 7 presents a mask, according to an embodiment.

In some embodiments, the selection area information may be represented as a mask. The mask may be configured to be able to extract image data corresponding only to the selection area SEL from the second still image when operated with the second still image. For example, the image data for the selection area SEL may be extracted from the second still image when the mask and the second still image are multiplied. FIG. 7 presents a mask as an example of the selection area information, according to an embodiment. In the present embodiment, the mask of FIG. 7 may have a high weight with respect to the selection area (SEL), and a low weight with respect to the still area (S-AREA). For example, the mask may have a weight of 1 in the selection area (SEL) and a weight of 0 in the still area (S-AREA).

In some embodiments, the mask may render an edge region of the selection area (SEL) with a gradation effect. For example, the mask may have decreasing weights in the edge region of the selection area (SEL), away from the selection area (SEL) toward the still area (S-AREA).

Referring back to FIG. 6, the image composition unit 220 may create the composite image based on the selection area information generated by the selection area information generating unit 610.

In particular, the mask may be applied to the second still image to extract image data corresponding to the selection area (SEL) from the second still image. For example, the mask may extract the image data corresponding to the selection area (SEL) from the second still image by multiplication with the second still image.

When the image data corresponding to the selection area (SEL) are extracted from the second still image, the extracted image data are combined with the first still image, so that a composite image is generated.

The image reproducing unit 230a sequentially reproduces the first still image and the composite image.

Figure 8:
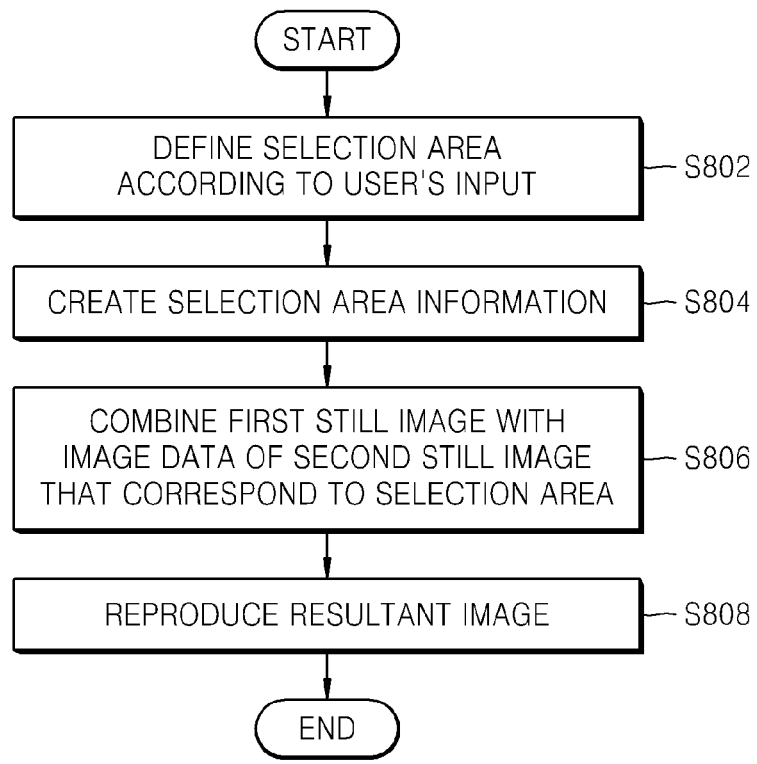
FIG. 8 is a flowchart of an image processing method, according to another embodiment.

FIG. 8 is a flowchart of an image processing method, according to another embodiment.

In the present embodiment, after a selection area (SEL) is defined according to user's input (S802), selection area information of the selection area (SEL) is created (S804). The image data corresponding to the selection area (SEL) is extracted from the second still image by using the mask, and is then combined with the first still image, thereby creating a composite image (S806). Thereafter, a resultant image sequentially displaying the first still image and the composite image is played (S808).

Figure 9:
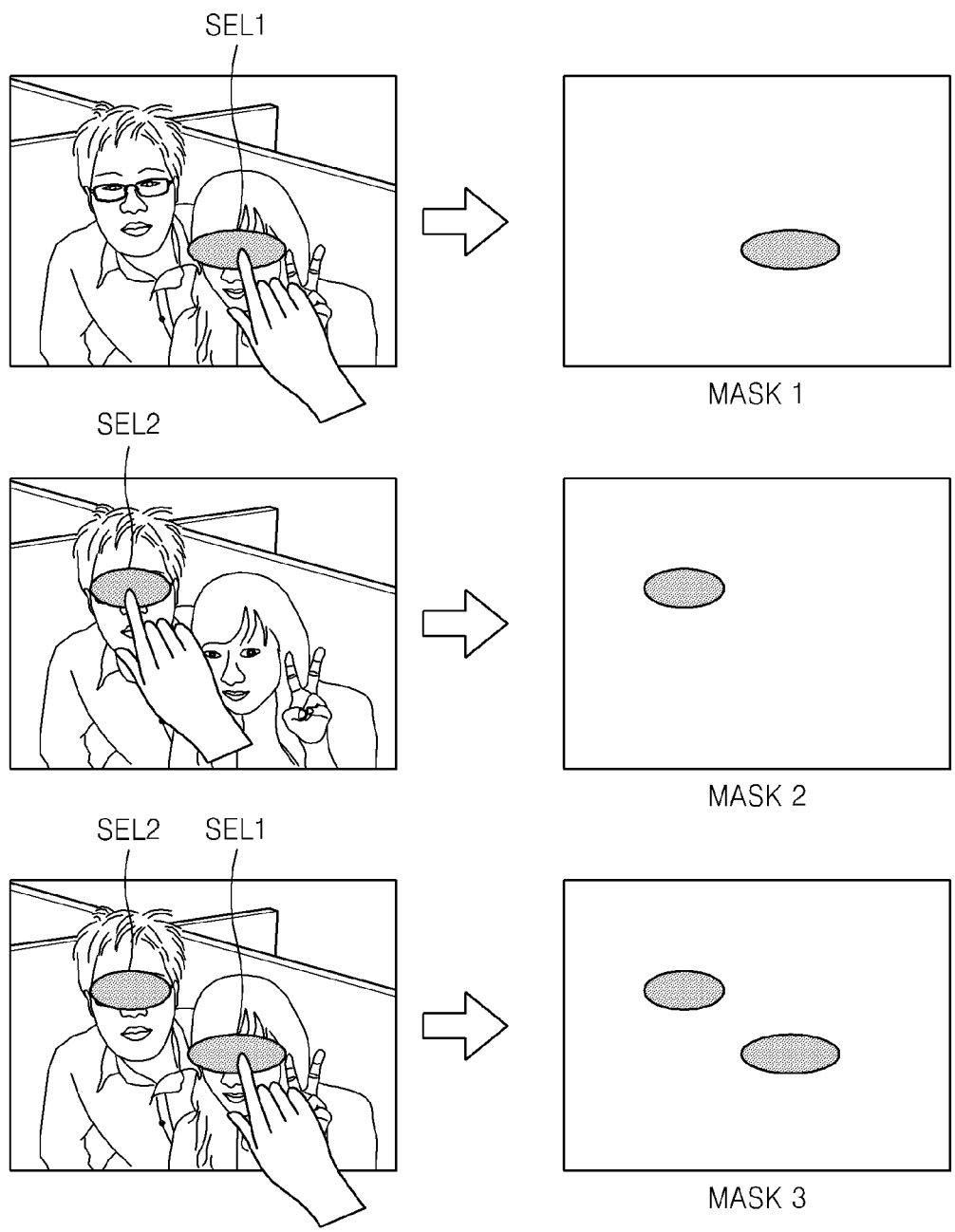
FIG. 9 is a diagram illustrating defining a selection area (SEL), according to an embodiment.

FIG. 9 is a diagram illustrating defining a selection area (SEL), according to an embodiment.

In the present embodiment, a user may designate a plurality of selection areas SEL1 and SEL2. With one of the selection areas (SEL1 or SEL2) designated, the user may additionally designate the other selection area SEL2 or SEL1, so that the plurality of selection areas SEL1 and SEL2 may be designated. A shape of the selection area(s) (SEL1 and/or SEL2) may be represented in a mask MASK1, MASK2, or MASK 3, as illustrated in FIG. 9.

In some other embodiments, the user may release and reset the designated selection areas (SEL1 and/or SEL2) by using a predetermined input.

In some embodiments, the user may stepwise cancel the operation of designating the selection area SEL1 and/or SEL2 by using a predetermined input. For example, if a user pushes a button to cancel one step after the user's designation of the selection area SEL2 by second input following the designation of the selection area SEL1 by first input, the last input operation, i.e., the second input operation of designating the selection area SEL2 is canceled, so that the selection area SEL2 may be deleted. In another embodiment, if a button to cancel one step is selected after extension of the selection area SEL2 by user's third input following the designation of the selection area SEL2 by the user's second input, the third input operation, i.e., the third input operation of extending the selection area SEL2 may be canceled, so that the second area SEL2 may return to the state designated by the second input.

In some embodiments, the user may designate the selection area SEL1 or SEL2 by touching a touch screen. In this way, the user may intuitively designate the selection areas SEL1 and SEL2, and thus, the user's convenience may be improved. In some embodiments, a gradation mask with a high weight with respect to the center of the selection area that is touched and a low weight with respect to an edge region around the center of the selection area as illustrated in FIG. 7 may be created.

In some embodiments where the selection area SEL1 or SEL2 is designated by a touch input, the image processing apparatus or digital photographing apparatus may include a touch screen or a touch pad. In these embodiments, the image processing apparatus or digital photographing apparatus may sense the touch input via the touch screen or touch pad, transmit at least one of coordinates, pressure, and area of the touch input sensed, or a combination thereof to the selection area setting unit 210. The selection area setting unit 210 may read the user's input based on the at least one of coordinates, pressure, and area of the touch input, or a combination thereof transmitted from the touch screen or touch pad, and define the selection area SEL1 or SEL2 according to the user's input.

In some embodiments, the user input for designating the selection area SEL1 or SEL2 may be drawing a pattern, for example, a loop, on the touch screen. Any of a variety of touch screen input patterns may be used to define the selection area SEL1 or SEL2.

In some other embodiments, the user input for designating the selection area SEL1 or SEL2 may be a key input. The user may designate the selection area SEL1 or SEL2 by a key input, for example, by drawing the selection area SEL1 or SEL2 or moving a predetermined cursor via a key input.

In some other embodiments, the image processing apparatus and method may assure image composition and reproduction of a resultant image promptly in response to user's input, i.e., immediately after the user input designating the selection area SEL1 or SEL2 is sensed.

Figure 10:
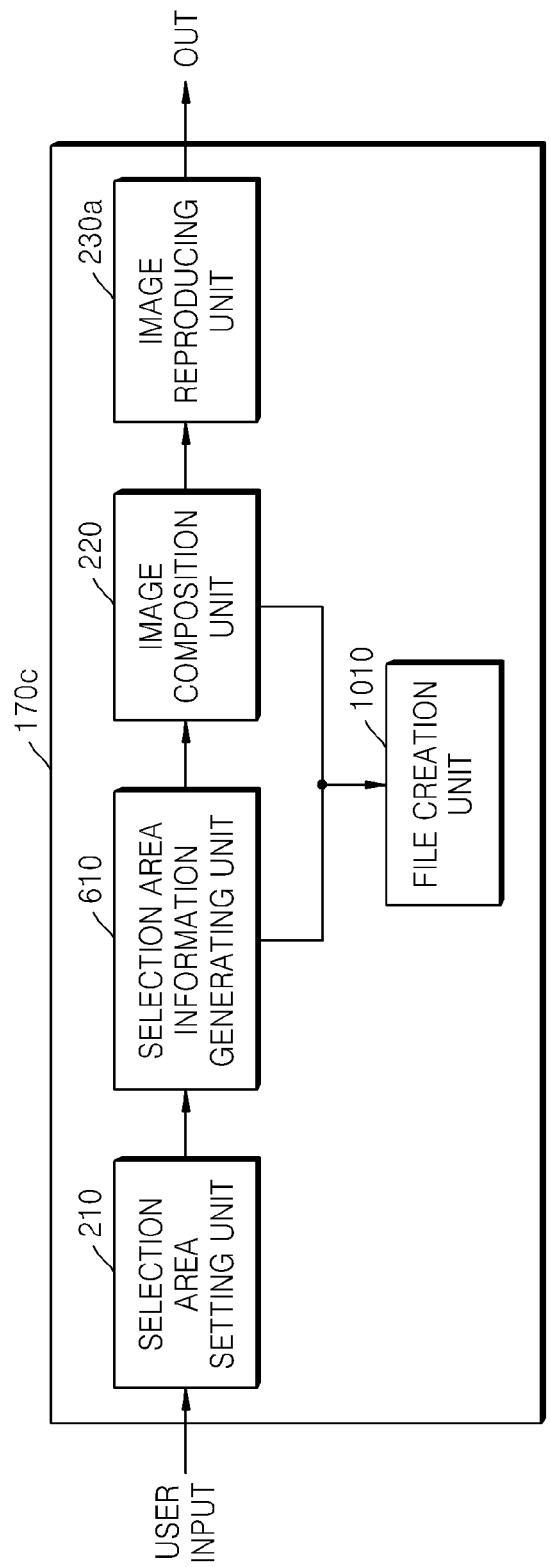
FIG. 10 is a block diagram illustrating a configuration of a CPU/DSP, according to another embodiment.

FIG. 10 is a block diagram illustrating a configuration of a CPU/DSP 170c, according to another embodiment.

In the present embodiment, the CPU/DSP 170c includes a selection area setting unit 210, a selection area information generating unit 610, an image composition unit 220, an image reproducing unit 230a, and a file creation unit 1010.

The selection area setting unit 210 sets a selection area SEL, SEL1, or SEL2 according to user's input.

The selection area information generating unit 610 generates selection area information of the selection area SEL, SEL1, or SEL2.

The image composition unit 220 extracts image data corresponding to the selection area SEL, SEL1, or SEL2 from the second still image by using the mask. The image composition unit 220 combines the image data extracted from the second still image with the first still image, thereby generating a composite image.

The file creation unit 1010 creates a resultant image file that stores a resultant image. A format of the resultant image file may be any file format capable of storing moving pictures, for example, graphics interchange format (GIF), or portable network graphics (PNG).

Figure 11:
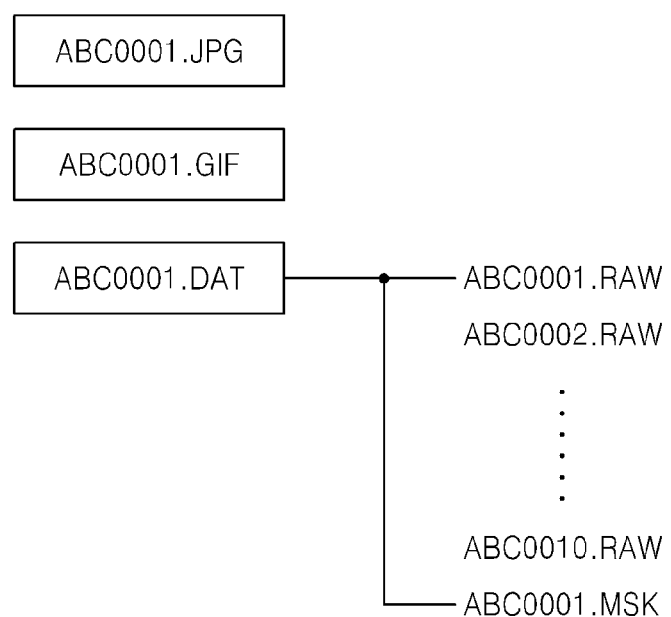
FIG. 11 illustrates file storage formats of a resultant image, according to an embodiment.

FIG. 11 illustrates file storage formats of a resultant image, according to an embodiment.

In the present embodiment, as illustrated in FIG. 11, a still image file of the first still image (ABC0001.JPG), a resultant image file (ABC0001.GIF), and a resultant image play file (ABC0001.DAT) may be created. Embedded systems mostly do not support a GIF file format, and thus, the digital photographing apparatus 100 may create a separate resultant image play file, i.e., ABC0001.DAT, for playing the resultant image. The resultant image play file (ABC0001.DAT) may include still image files (ABC0001.RAW, ABC0002.RAW, ABC0010.RAW) of the first still image and plurality of second still images, and a selection area information file (ABC0001.MSK). An image processing apparatus that does not support playing of the resultant image file (ABC0001.GIF) may play a resultant image by using the resultant image play file (ABC0001.DAT). Thus, electronic devices capable of decoding the resultant image file (ABC0001.GIF), for example, a personal computer or a laptop, may reproduce any resultant image according to the embodiments of the present disclosure by using the resultant image file format (ABC0001.GIF). On the other hand, electronic devices not able to decode the resultant image file (ABC0001.GIF), for example, a portable camera, may play any resultant image according to the embodiments of the present disclosure by using the resultant image play file format (ABC0001.DAT).

In some embodiments, the still image files (ABC0001.RAW, ABC0002.RAW, ABC0010.RAW) of the resultant image play file (ABC0001.DAT) may be any data format that does not need to be decoded in an image processing apparatus or a digital photographing apparatus.

For rapid image processing in playing the resultant image, decoding may be omitted. To this end, the still image files (ABC0001.RAW, ABC0002.RAW, . . . , ABC0010.RAW) that do not need decoding may be used as the resultant image play file (ABC0001.DAT).

In some embodiments, the still image files (ABC0001.RAW, ABC0002.RAW, . . . , ABC0010.RAW) of the resultant image play file (ABC0001.DAT) may be image data of which size is adjusted according to a display resolution of the image processing apparatus or digital photographing apparatus. For example, in the digital photographing apparatus, the still image files (ABC0001.RAW, ABC0002.RAW, . . . , ABC0010.RAW) of the resultant image play file (ABC0001.DAT) may have a size equal to a screen nail size. When playing a resultant image with the above configuration, the digital photographing apparatus may use a reduced processing time and less storage capacity for the resultant image play file (ABC0001. DAT).

In some embodiments, the still image files (ABC0001.RAW, ABC0002.RAW, . . . , ABC0010.RAW) of the resultant image play file (ABC0001.DAT) may be in compressed format, such as JPG.

Figure 12:
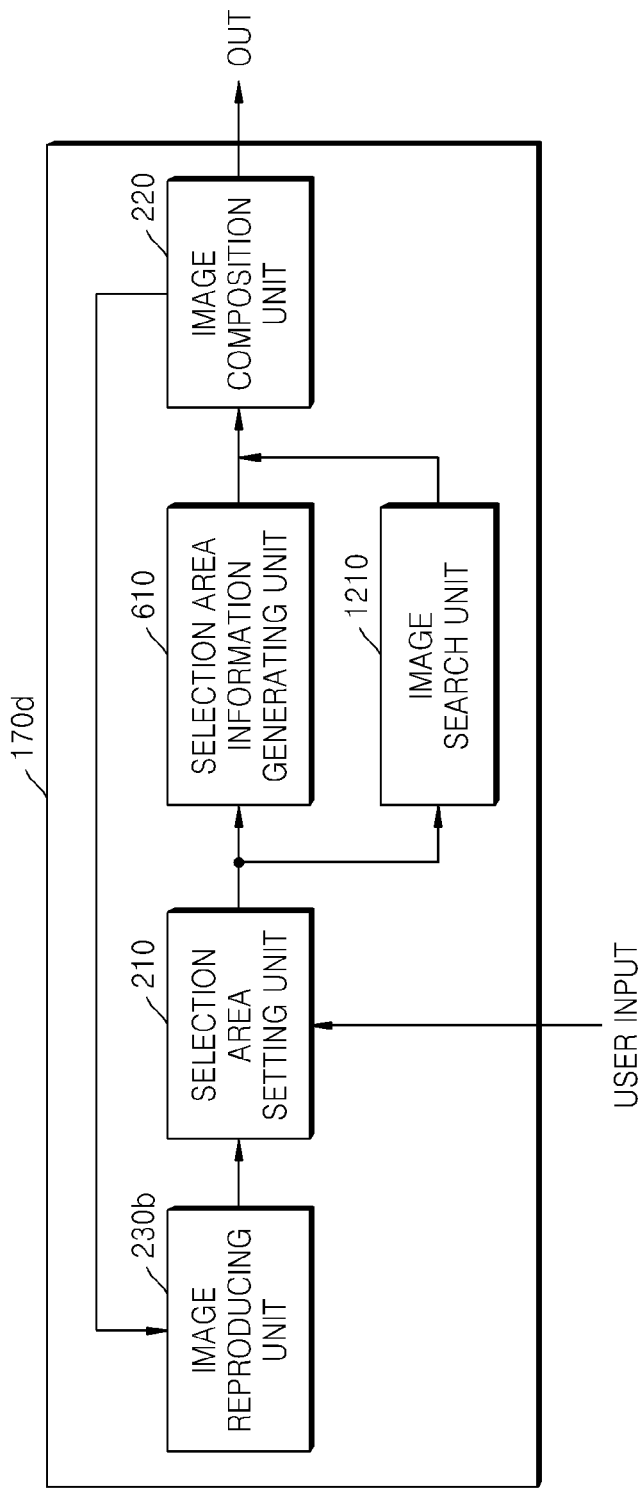
FIG. 12 is a block diagram illustrating a configuration of a CPU/DSP, according to another embodiment.

FIG. 12 is a block diagram illustrating a configuration of a CPU/DSP 170d, according to another embodiment.

In the present embodiment, the CPU/DSP 170d includes an image reproducing unit 230b, a selection area setting unit 210, a selection area information generating unit 610, an image search unit 1210, and an image composition unit 220.

During a play mode of the digital photographing apparatus 100, the user may create and display a resultant image. In some other embodiments, the user may create and reproduce a resultant image during reproducing of a still image.

The image reproducing unit 230b reproduces an image from a stored image file.

The selection area setting unit 210 defines a selection area SEL, SEL1, or SEL2 in a playback reproduction image according to a user's input.

In some embodiments, the user may be allowed to set the selection area SEL, SEL1, or SEL2 in a playback image and reproduce the same only when the playback image is a continuous shot image. In an embodiment, to indicate that the playback image is a continuous shot image, the selection area setting unit 210 may display an icon indicating a continuous shot image in the playback image. In some embodiments, the selection area setting unit 210 may provide a user with a menu for setting the selection area SEL, SEL1, or SEL2.

In some embodiments, if the user defines a selection area SEL, SEL1, or SEL2) in a playback image, the playback image is set as a first still image.

The selection area information generating unit 610 creates a mask for defining the selection area SEL, SEL1, or SEL2.

When the selection area SEL, SEL1, or SEL2 is defined in the playback image, the image search unit 1210 searches for a second still image shot to be continuous with the playback image. In searching for the second still image, information about continuous shot images recorded in a header section of the playback image may be referred to. In another embodiment, images shot to be continuous with the playback image may be searched for via file names.

The image composition unit 220 may combine the playback image with data of the second still image that correspond to the selection area SEL, SEL1, or SEL2 to create a resultant image, and provides the resultant image to the image reproducing unit 230b.

The image reproducing unit 230b reproduces the resultant image.

Figure 13:
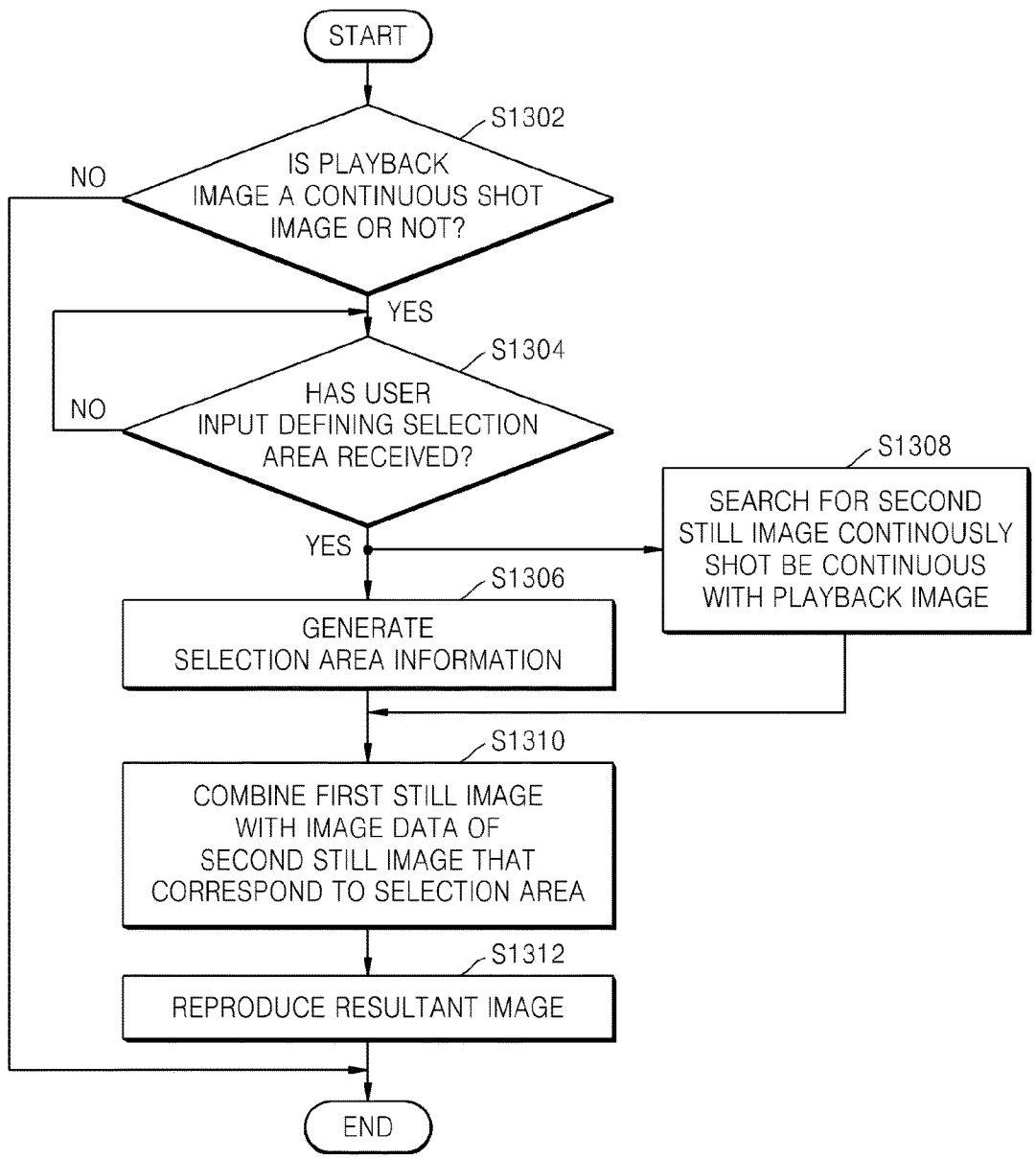
FIG. 13 is a flowchart of an image processing method, according to another embodiment.

FIG. 13 is a flowchart of an image processing method, according to another embodiment.

In the present embodiment, whether a playback image is a continuous shot image or not is determined (S1302). If the playback image is a continuous shot image, a user interface for resultant image designation may be provided to the user.

If user input that designates the selection area SEL, SEL1, or SEL2 in the playback image is detected (S1304), a mask representing the selection area SEL, SEL1, or SEL2 is created (S1306). A second still image shot to be continuous with the playback image is searched for (S1308). Next, the first still image is combined with the image data of the second still image that correspond to the selection area SEL, SEL1, or SEL2 to generate a composite image (S1310), and a resultant image sequentially displaying the first still image and the composite image is reproduced (S1312). A resultant image file and/or a resultant image play file may be created.

Figure 14:
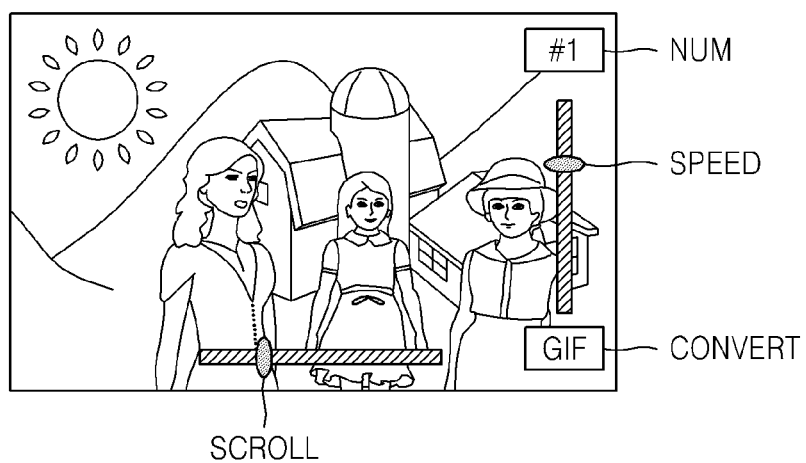
FIG. 14 is a diagram for describing a method of playing a resultant image, according to an embodiment.

FIG. 14 is a diagram for describing a method of reproducing a resultant image, according to an embodiment.

In the present embodiment, when a resultant image is reproduced, a display speed adjustment menu SPEED for the resultant image may be provided. For example, a motion speed of the resultant image may be adjusted by varying the speed of switching a plurality of composite images.

When a resultant image is reproduced, a still image selection menu (SCROLL) for selection of the first still image or composite image being displayed may be provided. For example, to display a composite image of the first still image and a third second still image of ten second still images while the resultant image is reproduced, the user may select the first still image or composite image to be displayed by moving a still image selection menu (SCROLL).

In the present embodiment, the resultant image may be provided along with a serial number icon (NUM) that indicates a serial number of the still image currently being displayed in the resultant image.

In some embodiments, with only a resultant image play file being generated, but the resultant image file not generated yet, a convert menu (CONVERT) for generating the resultant image may be provided. In this case, using a first image still image, the plurality of second still images, and the selection area information, a resultant image with a resultant image file format, for example, gif or png, is generated and stored in a resultant image file.

In the above-described embodiments of the disclosure, conveniently, a subject may be expressed with a moving effect by using still images, so that the subject may appear more appealing.

In the above-described embodiments of the disclosure, the subject with such a moving effect may be recorded with less storage capacity.

The invention can also be embodied as computer readable codes on a non-transitory computer readable recording medium. The invention can be embodied as a non-transitory computer readable recording medium storing at least one of the resultant image file and the resultant image play file. The non-transitory computer readable recording medium is any data storage device that can store data that can be thereafter read by a computer system.

The computer readable codes may implement the operations of an image processing method according to the present disclosure when read from the computer readable recording medium and executed by a processor (for example, by the CPU/DSP 170, 170a, or 170b). These computer readable codes may be implemented in any of a variety of programming languages. Also, functional programs, codes, and code segments for accomplishing the various embodiments can be easily construed by programmers skilled in the art to which the invention pertains.

While the invention has been particularly shown and described with reference to exemplary embodiments thereof, it will be understood by those of ordinary skill in the art that various changes in form and details may be made therein without departing from the spirit and scope of the invention as defined by the following claims.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:
1. An apparatus comprising:
a camera;
a touch screen; and
a processor adapted to:
  obtain, via the camera, a first image and a second image corresponding to at least one same object external to the apparatus;
  receive, via the touch screen, a first touch input to select a first subarea in the first image, wherein the first touch input is a gesture for drawing a pattern on the touch screen for designating the first subarea;
generate a composite image using the first image and image data of the second image corresponding to the first subarea, wherein the first subarea is a gradation mask with a high weight with respect to a center of a selection area that is touched and a low weight with respect to an edge region around the center of the selection area;
reproduce the first image and the composite image such that at least one portion of the first subarea is displayed as a moving portion and a remaining portion of the first image is displayed as a still portion;
while the at least one portion is displayed as the moving portion, receive a second touch input via the touch screen to select a second subarea in the first image or the composite image, wherein the second touch input is a gesture for drawing a pattern on the touch screen for designating the second subarea, and the second subarea is a gradation mask which has a high weight with respect to a center of a selection region that is touched and a low weight with respect to an edge region around the selection region; and
in response to a touch input for changing the first subarea, display an image in which the changed first subarea and the second subarea are displayed as moving portions, wherein the changed first subarea is a gradation mask which has a low weight with respect to a changed edge region.

2. The apparatus of claim 1, wherein the first touch input or the second touch input comprises a dragging input, and wherein the processor is adapted to:
determine a size or a shape of a corresponding one of the first subarea and the second subarea based at least in part on the dragging input.

3. The apparatus of claim 1, wherein the processor is adapted to:
determine the first subarea or the second subarea based at least in part on coordinates, a pressure, or an area associated with a corresponding one of the first touch input and the second touch input.

4. The apparatus of claim 1, wherein the processor is adapted to:
perform the receiving of the second touch input while a corresponding one of the first subarea and the second subarea is displayed as the masked area.

5. The apparatus of claim 1, wherein the processor is adapted to:
change a contour or a size of the first subarea in response to the second touch input.

6. The apparatus of claim 1, wherein the processor is adapted to:
render an edge region of the first subarea or the second subarea with a gradation effect.

7. A mobile phone device comprising:
a camera;
a touch screen; and
a processor adapted to:
obtain, via the camera, a first image and a second image corresponding to at least one same object external to the mobile phone device;
receive, via the touch screen, a first touch input to select a subarea in the first image, wherein the first touch input is a gesture for drawing a pattern on the touch screen for designating the subarea;
generate a composite image using the first image and image data of the second image corresponding to the subarea, wherein the subarea is a gradation mask with a high weight with respect to a center of a selection area that is touched and a low weight with respect to an edge region around the center of the selection area;
reproduce the first image and the composite image such that at least one portion of the subarea is displayed as a moving portion and a remaining portion of the first image is displayed as a still portion; and
in response to a touch input for changing the subarea, display an image in which the changed subarea is displayed as a moving portion, wherein the changed subarea is a gradation mask which has a low weight with respect to a changed edge region.

8. The mobile phone device of claim 7, wherein the processor is adapted to:
obtain the first image and the second image continuously.

9. The mobile phone device of claim 7, wherein the processor is adapted to:
render an edge region of the subarea with a gradation effect.

10. The mobile phone device of claim 7, wherein the processor is adapted to:
while the subarea is displayed as the moving portion, receive another touch input via the touch screen to select another subarea in the first image or the composite image.

11. The mobile phone device of claim 7, wherein the processor is adapted to:
change a contour or a size of the subarea in response to another touch input via the touch screen.

12. The mobile phone device of claim 7, wherein the processor is adapted to:
adjust a speed of the moving portion associated with the reproducing in response to another input.

13. The mobile phone device of claim 7, wherein the composite image comprises a first composite image and a second composite image, and wherein the processor is adapted to:
select a corresponding composite image of the first composite image and the second composite image in response to an input via a progress bar displayed on the touch screen; and
display the corresponding composite image via the touch screen.

14. The mobile phone device of claim 7, wherein the processor is adapted to:
extract the image data from the second image; and
combine the extracted image data and a remaining portion of the first image other than the subarea to generate the composite image.

15. A mobile phone device comprising:
a camera;
a touch screen; and
a processor adapted to:
obtain, via the camera, a first image and a second image corresponding to at least one same object external to the mobile phone device;
receive, via the touch screen, a touch input to select a subarea in the first image, wherein the touch input is a gesture for drawing a pattern on the touch screen for designating the subarea;
reproduce, via the touch screen, at least one portion of the subarea of the first image as a moving portion, and a remaining portion of the first image as a still portion, the moving portion generated using the at least one portion of the subarea as a gradation mask and at least one portion of the second image corresponding to the at least one portion of the subarea, wherein the gradation mask has a high weight with respect to a center of a selection area that is touched and a low weight with respect to an edge region around the center of the selection area; and in response to a touch input for changing the subarea, display an image in which the changed subarea are displayed as a moving portion, wherein the changed subarea is a gradation mask which has a low weight with respect to a changed edge region.

16. The mobile phone device of claim 15, wherein the processor is adapted to:

obtain the first image and the second image continuously.

17. The mobile phone device of claim 15, wherein the processor is adapted to:

render an edge region of the subarea with a gradation effect.

18. The mobile phone device of claim 15, wherein the processor is adapted to:

while the moving portion is displayed, receive another touch input with respect to the first image to select another subarea in which another moving portion is to be displayed.

19. The mobile phone device of claim 15, wherein the processor is adapted to:

terminate the displaying of the moving portion in response to another input.

* * * * *